US011679886B2

(12) United States Patent
Berjot et al.

(10) Patent No.: US 11,679,886 B2
(45) Date of Patent: Jun. 20, 2023

(54) DEVICE FOR CONNECTING AN AIRCRAFT ENGINE AND A PRIMARY STRUCTURE OF AN AIRCRAFT PYLON COMPRISING A RUDDER AND A SYSTEM FOR LIMITING THE DISPLACEMENT OF THE RUDDER INCORPORATING A DOUBLE STOP, AIRCRAFT COMPRISING SUCH A DEVICE

(71) Applicant: Airbus Operations SAS, Toulouse (FR)

(72) Inventors: Michael Berjot, Toulouse (FR); Rémi Lansiaux, Toulouse (FR); William Bras, Toulouse (FR); Germain Gueneau, Toulouse (FR); Sébastien Van Arendonk, Toulouse (FR); Jacques Demange, Toulouse (FR); Sébastien Commenge, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/725,641

(22) Filed: Apr. 21, 2022

(65) Prior Publication Data

US 2022/0340293 A1    Oct. 27, 2022

(30) Foreign Application Priority Data

Apr. 27, 2021 (FR) ..................... 2104382

(51) Int. Cl.
*B64D 27/26* (2006.01)
*B64D 27/18* (2006.01)
*F02C 7/20* (2006.01)

(52) U.S. Cl.
CPC .............. *B64D 27/18* (2013.01); *F02C 7/20* (2013.01); *B64D 2027/268* (2013.01)

(58) Field of Classification Search
CPC .................................................. B64D 2027/26
See application file for complete search history.

(56) References Cited

U.S. PATENT DOCUMENTS 5,873,547 A * 2/1999 Dunstan ................ B64D 27/26
60/797
6,296,203 B1 * 10/2001 Manteiga .............. B64D 27/18
60/797

(Continued)

FOREIGN PATENT DOCUMENTS

| EP | 1157925 A2 | 11/2001 |
| FR | 3058986 A1 | 5/2018 |
| FR | 3093504 A1 | 9/2020 |

OTHER PUBLICATIONS

French Search Report; priority document.

*Primary Examiner* — Todd E Manahan
*Assistant Examiner* — Marc J Amar
(74) *Attorney, Agent, or Firm* — Greer, Burns & Crain, Ltd.

(57) ABSTRACT

A linking device connecting an aircraft engine and a primary structure of an aircraft pylon, comprising a support connected to the primary structure, a spreader having a central part connected to the support and a first and a second end that are connected to thrust rods, at least one limiting system for limiting the travel of the spreader having an upper and a lower stop between which is positioned the first or second end of the spreader, the upper and the lower stop being connected to one another so as to form a single part connected to a fitting secured to the support.

9 Claims, 4 Drawing Sheets

(56) References Cited

U.S. PATENT DOCUMENTS

| | | | | |
|---|---|---|---|---|
| 2001/0025902 A1* | 10/2001 | Jule | ......................... | B64D 27/18 |
| | | | | 244/54 |
| 2003/0066928 A1* | 4/2003 | Brefort | .................. | B64D 27/26 |
| | | | | 244/54 |
| 2004/0251380 A1* | 12/2004 | Pasquer | .................. | B64D 27/26 |
| | | | | 244/54 |
| 2008/0169377 A1* | 7/2008 | Levert | .................... | B64D 27/26 |
| | | | | 244/54 |
| 2009/0294580 A1* | 12/2009 | Sammito | ................ | B64D 27/26 |
| | | | | 244/54 |
| 2009/0308972 A1* | 12/2009 | Foster | .................... | B64D 27/26 |
| | | | | 244/54 |
| 2010/0127117 A1* | 5/2010 | Combes | ................. | B64D 27/26 |
| | | | | 244/54 |
| 2018/0327102 A1* | 11/2018 | Couffignal | .............. | B64D 27/26 |
| 2019/0032518 A1* | 1/2019 | Suciu | ..................... | B64D 27/02 |
| 2020/0346771 A1* | 11/2020 | Deforet | ................. | B64D 27/26 |
| 2020/0346777 A1* | 11/2020 | Tong | ...................... | B64D 31/00 |
| 2022/0090518 A1* | 3/2022 | Berjot | ..................... | F01D 25/28 |

* cited by examiner

DEVICE FOR CONNECTING AN AIRCRAFT ENGINE AND A PRIMARY STRUCTURE OF AN AIRCRAFT PYLON COMPRISING A RUDDER AND A SYSTEM FOR LIMITING THE DISPLACEMENT OF THE RUDDER INCORPORATING A DOUBLE STOP, AIRCRAFT COMPRISING SUCH A DEVICE

CROSS-REFERENCES TO RELATED APPLICATIONS

This application claims the benefit of the French patent application No. 2104382 filed on Apr. 27, 2021, the entire disclosures of which are incorporated herein by way of reference.

BACKGROUND OF THE INVENTION

The present application relates to a linking device connecting an aircraft engine and a primary structure of an aircraft pylon comprising a spreader and a system for limiting the travel of the spreader incorporating a double stop. The present application also relates to an aircraft comprising such a linking device.

According to an embodiment that can be seen in FIGS. 1 and 2, an aircraft 10 comprises multiple propulsion units 12 positioned underneath each of the wings 14 of the aircraft. Each propulsion unit 12 comprises an engine 16, a nacelle (not shown in FIG. 2) positioned around the engine 16, and a pylon 18 connecting the engine 16 and the wing 14. The pylon 18 comprises a primary structure 20 which is connected to the engine 16 by an engine attachment 22 and to the wing 14 by a wing attachment 24.

The engine attachment 22 comprises a front engine attachment 26, a rear engine attachment 28 and a couple of thrust rods 30, 30' which take up thrust forces.

According to an embodiment that can be seen in FIG. 3, each thrust rod 30, 30' comprises a rear end 30.1, 30.1' connected to the primary structure 20 by a linking device 32 and a front end connected to the engine 16.

The linking device 32 comprises:
a support 34, secured to the primary structure 20, having a main clevis 36,
a spreader 38 connected to the main clevis 36 by a main link 40 having a main rotary axle positioned in a vertical plane.

Each rear end 30.1, 30.1' of the thrust rods 30, 30' is connected to one of the ends of the spreader 38 by a secondary link 42, 42' having a secondary rotary axle positioned in a vertical plane.

The thrust rods 30, 30', the secondary links 42, 42', the spreader 38, the main link 40 and the support 34 define two primary thrust paths between the engine 16 and the primary structure 20.

The linking device 32 also comprises two fittings 44, 44', one for each thrust rod 30, 30', which are secured to the support 34, are disposed on either side of the main clevis 36 and are connected to the thrust rods 30, 30' by the secondary pivoting links 42, 42'. The fittings 44, 44' define two secondary thrust paths which compensate for possible failure of one of the primary thrust paths.

In order to decouple certain dedicated modes of the primary thrust pathways from the engine frequencies, documents FR 3.093.504 and US 2020/0346771 provide a system for limiting the travel of the spreader 38 outside of the spreader plane. According to these documents, the spreader 38 comprises, at each of its ends, an extension 46 and the linking device 32 comprises, for each fitting 44, 44', an upper and a lower stop 48.1, 48.2 which are separate, are fixed to the fitting 44, 44' and between which is positioned one of the extensions 46 of the spreader 38.

As illustrated in FIG. 4, during the assembly, for each fitting 44, 44', the upper stop 48.1 is fixed to the fitting 44, 44' such that there remains a calibrated clearance of about 0.15 mm between the upper stop 48.1 and the extension 46. In addition, the lower stop 48.2 is fixed to the fitting 44, 44' such that there remains a calibrated clearance of about 0.15 mm between the lower stop 48.2 and the extension 46. Therefore, the travel of the spreader 38 outside of the spreader plane is limited.

In order to implement this adjustment, the upper and the lower stop 48.1, 48.2 each comprise a shoulder 50 positioned facing a reference face 52 of the fitting and an adjustment spacer 54 of calibrated thickness, of about 1 mm, is interposed between the shoulder 50 of each, upper and lower, stop 48.1, 48.2 and the reference face 52 of the fitting 44, 44'.

According to this embodiment, the adjustment of the travel of the spreader 38 depends on the exact positioning of the two stops, the upper and the lower, 48.1, 48.2, by virtue of the adjustment spacers 54. However, it is difficult to manipulate the adjustment stops 54, given their positioning, when the two stops, the upper and the lower, 48.1, 48.2, are being installed and adjusted.

In another drawback, this exact positioning of the two stops, the upper and the lower, 48.1, 48.2 must be performed each time the thrust rods 30, 30' are mounted and dismounted.

SUMMARY OF THE INVENTION

The present invention seeks to remedy all or some of the drawbacks of the prior art.

To that end, the invention relates to a linking device connecting an aircraft engine and a primary structure of an aircraft pylon, comprising:
a support configured to be connected to the primary structure,
a spreader, extending between a first and a second end, which has a central part connected to the support by a main link,
a first thrust rod having a first end connected to the first end of the spreader by a first secondary link and a second end configured to be connected to the engine,
a second thrust rod having a first end connected to the second end of the spreader by a second secondary link and a second end configured to be connected to the engine,
a first and a second fitting, that are secured to the support and have an upper and a lower branch between which the spreader is positioned,
at least one limiting system for limiting a travel of the spreader having a double stop comprising an upper and a lower stop which are secured to the first or second fitting and between which is positioned the first or second end of the spreader,
and a linking system connecting the double stop to the first or second fitting, the double stop forming one and the same part.

According to the invention, at least a first branch from among the upper and the lower branch of the first or second fitting comprises a through-orifice and the double stop comprises a through-hole. In addition, the linking system comprises:

a tie rod which has a shank passing through the through-orifice in the first branch and through the through-hole in the double stop, a head at a first end of the shank and a threaded portion at a second end of the shank, the head having a diameter greater than that of the through-orifice in the first branch, at least a first ring positioned around the shank of the tie rod and interposed between the double stop and the first branch, the first ring having an outside diameter greater than the diameter of the through-orifice in the first branch and a length which is determined such that the first or second end of the spreader is positioned between the upper and the lower stop, a nut screwed onto the threaded portion of the tie rod so as to prevent the tie rod, the first ring and the double stop from moving in translation with respect to the first branch.

Therefore, the spacing between the upper and the lower stop, which determines the extent of the travel of the first or second end of the spreader, is not regulated in situ during independent mounting of the two stops, the upper and the lower, but during the manufacture of the double stop.

According to another feature, the double stop is a part exhibiting symmetry of revolution and comprises a cylindrical body, a first flange at a first end of the cylindrical body and a second flange at a second end of the cylindrical body; the cylindrical body, the first and the second flange being coaxial, the first flange having a face oriented towards the second flange which forms the upper stop and the second flange having a face oriented towards the first flange which forms the lower stop.

According to another feature, the first ring and the double stop have inside diameters that are substantially equal to the diameter of the shank of the tie rod.

According to another feature, the double stop and the first ring form one and the same part.

According to another feature, the linking system comprises a second ring positioned around the shank of the tie rod and interposed between the double stop and the nut.

According to another feature, a second branch from among the upper and the lower branch, that is different from the first branch, comprises a through-orifice having a diameter substantially equal to an outside diameter of the second ring, the shank of the tie rod having a length such that the second ring is housed at least partially in the through-orifice in the second branch.

According to another feature, the second ring has an inside diameter substantially equal to the diameter of the shank of the tie rod.

According to another feature, the linking device comprises a first and a second limiting system, interacting respectively with the first and the second end of the spreader.

The invention also relates to an aircraft comprising at least one linking device according to one of the preceding features.

BRIEF DESCRIPTION OF THE DRAWINGS

Other features and advantages will emerge from the following description of the invention, which description is given solely by way of example, with reference to the appended drawings in which.

DETAILED DESCRIPTION OF THE PREFERRED EMBODIMENTS

Figure 1:
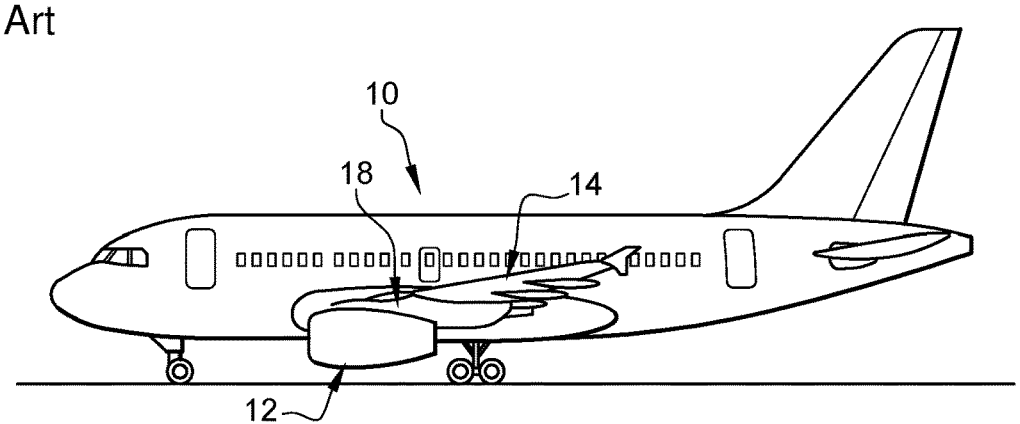
FIG. 1 is a side view of an aircraft.
Figure 2:
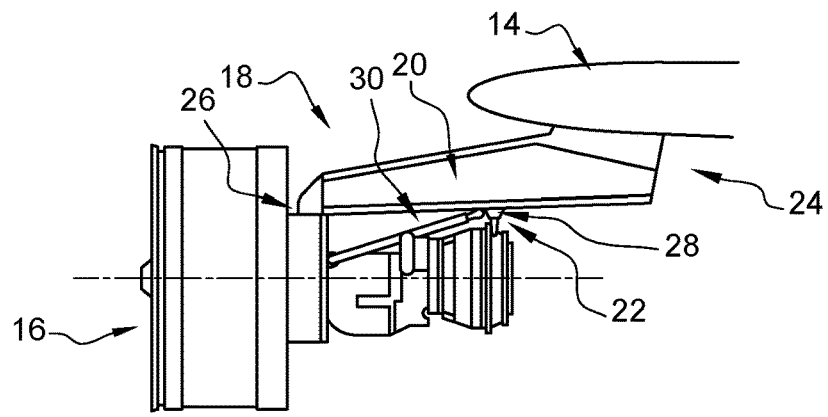
FIG. 2 is a schematic lateral representation of a propulsion unit (the nacelle not being shown)
Figure 3:
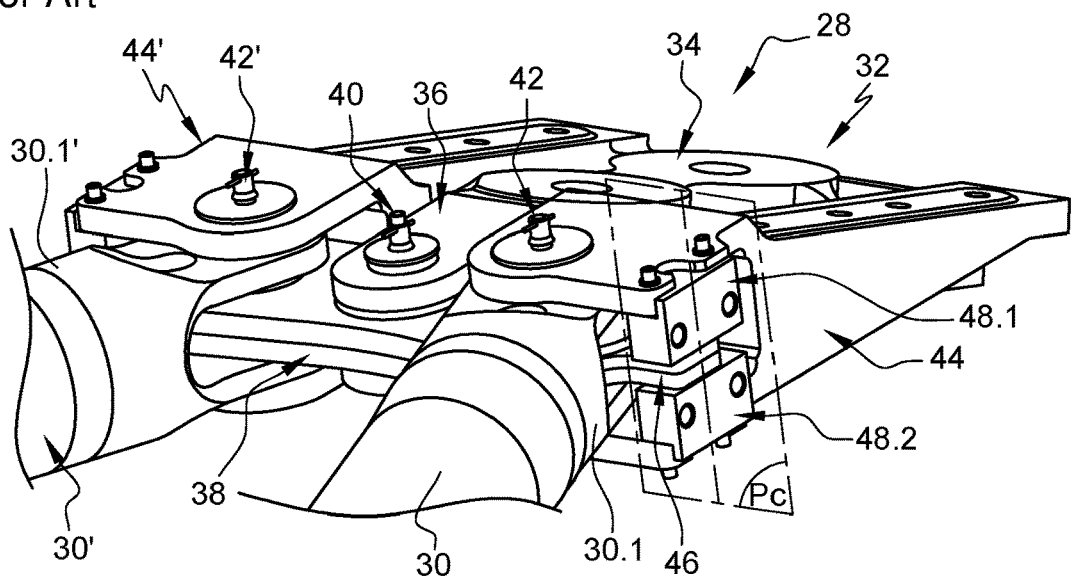
FIG. 3 is a perspective view of a linking device connecting thrust rods and a primary structure of an aircraft pylon, illustrating one embodiment of the prior art.
Figure 4:
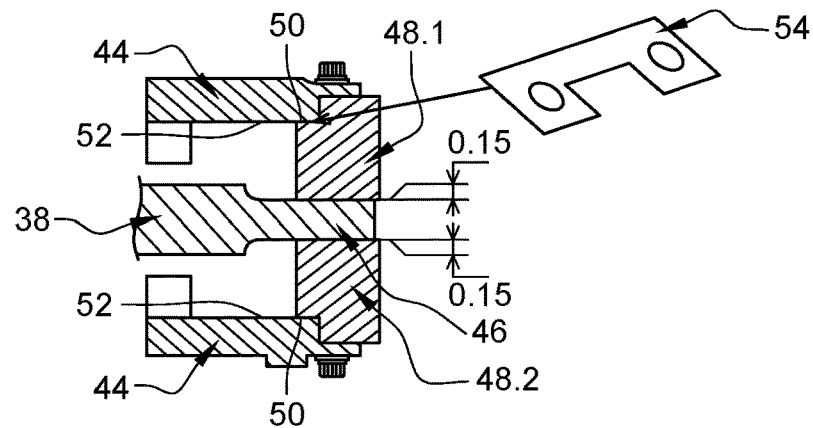
FIG. 4 is a sectional view through the plane PC of a part of the linking device that can be seen in FIG. 3.
Figure 5:
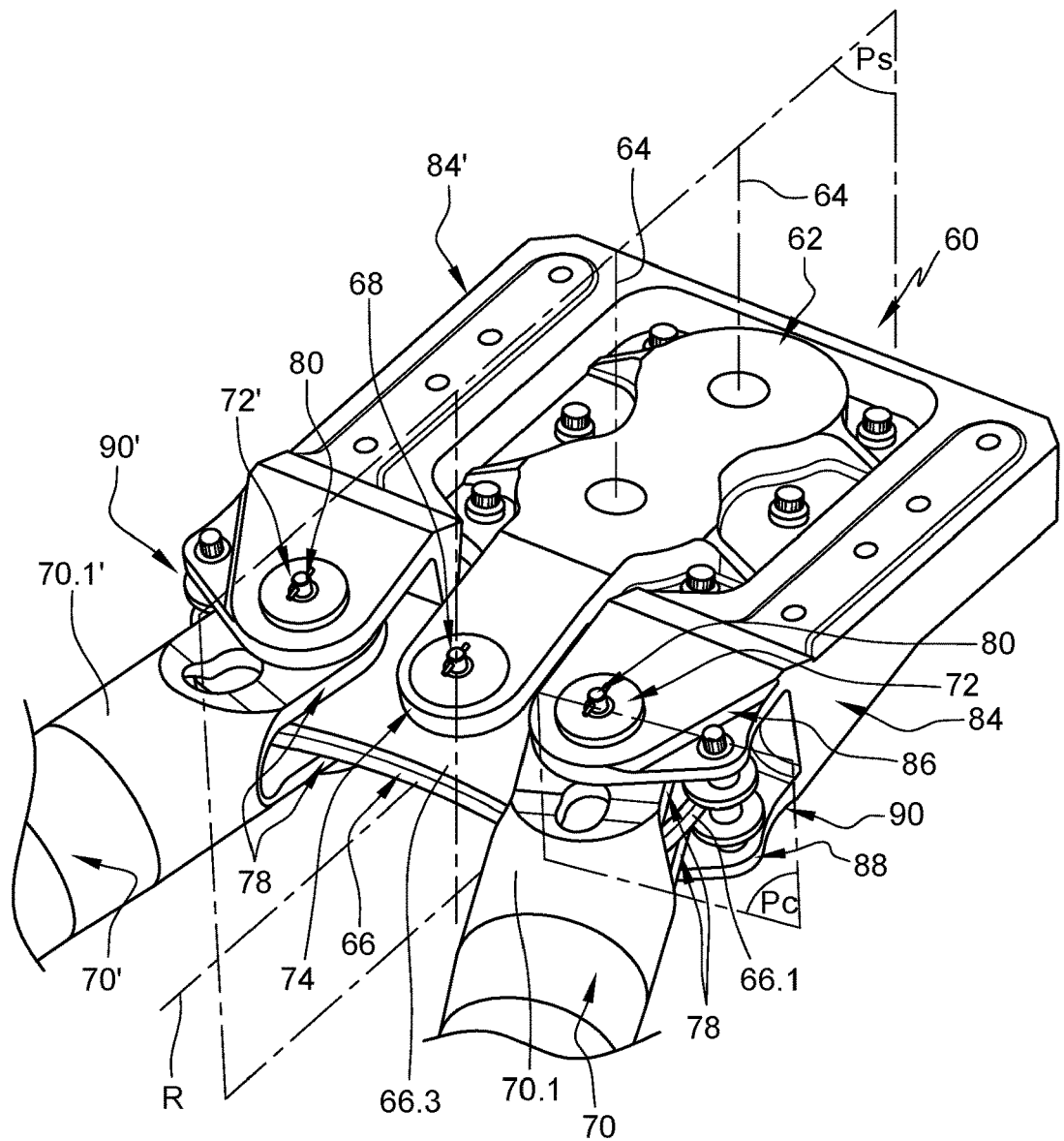
FIG. 5 is a perspective view of a linking device connecting thrust rods and a primary structure of an aircraft pylon, illustrating one embodiment of the invention.
Figure 6:
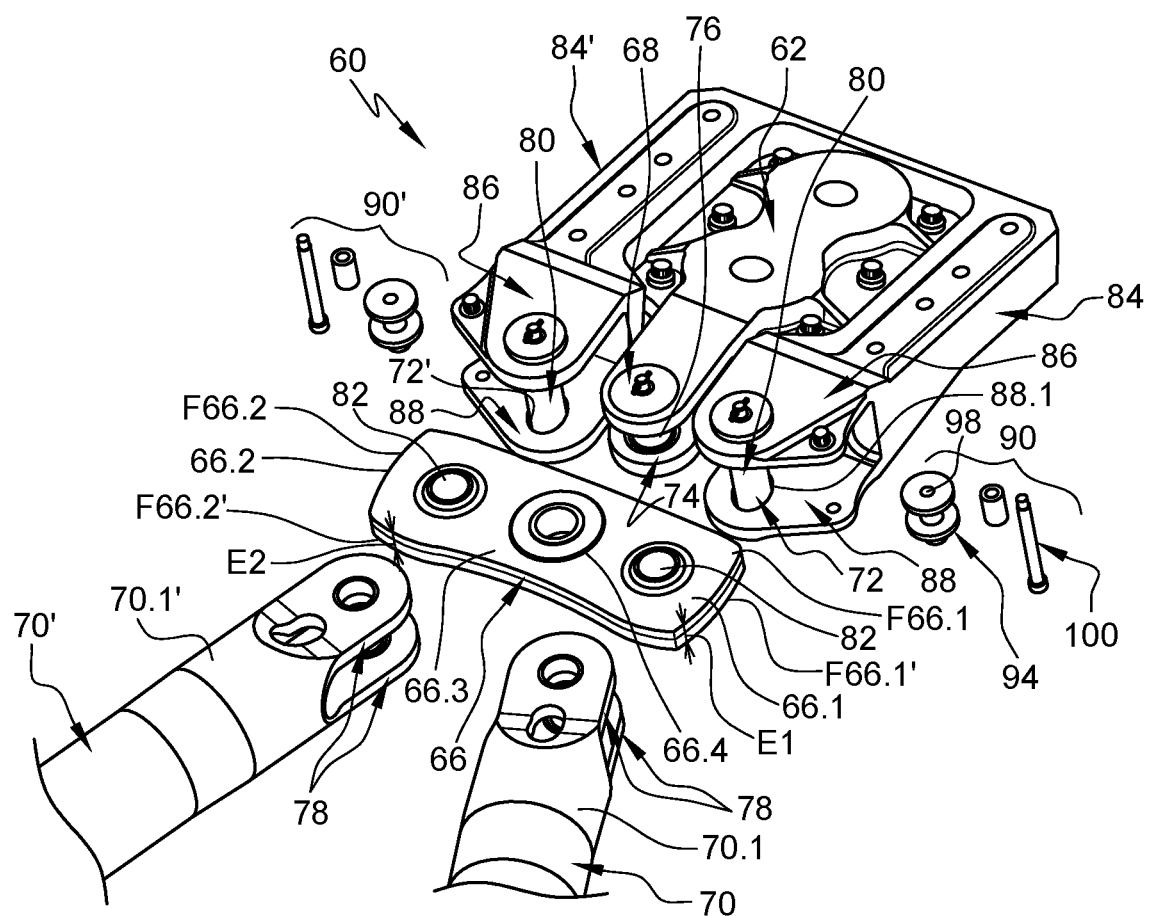
FIG. 6 is a perspective view of various dismounted elements of the linking device that can be seen in FIG. 5.

FIGS. 5 to 8 show a linking device 60 connecting an engine and a primary structure of an aircraft pylon (not shown).

This linking device 60 comprises:
- a support 62 (also referred to as a beam) connected to the primary structure by linking elements 64 (shown schematically by center lines),
- a spreader 66, which extends between a first and a second end 66.1, 66.2, having a central part 66.3 connected to the support 62 by a main link 68,
- a first thrust rod 70 which has a first end 70.1 connected to the first end 66.1 of the spreader 66 by a first secondary link 72 and a second end connected to the engine, and
- a second thrust rod 70' which has a first end 70.1' connected to the second end 66.2 of the spreader 66 by a second secondary link 72' and a second end connected to the engine.

The main link 68 comprises a main clevis 74 connected to the support 62 and a main rotary axle 76 supported by the main clevis 74 and passing through a main orifice 66.4 which passes through the spreader 66. A ball joint may be interposed between the main rotary axle 76 and the spreader 66.

The spreader 66 is in the form of a plate or multiple plates positioned in a plane approximately perpendicular to the main rotary axle 76.

Irrespective of the embodiment, the spreader 66 comprises, at the first end 66.1, a first thickness E1, an upper face F66.1 and a lower face F66.1', and, at the second end 66.2, a second thickness E2, an upper face F66.2 and a lower face F66.2'. According to one configuration, the first and the second thickness E1, E2 are equal, the upper faces F66.1, F66.2 are coplanar and the lower faces F66.1', F66.2' are coplanar.

Each of the first and second secondary links 72, 72' comprises a secondary clevis 78, provided at each of the rear ends 70.1, 70.1' of the rods 70, 70', and a secondary rotary axle 80 supported by the secondary clevis 78 and housed in an orifice 82, passing through the spreader 66, provided at each of the first and the second end 66.1, 66.2 of the spreader 66. A ball joint may be provided between the secondary rotary axle 80 and the orifice 82 in the spreader 66.

The linking device 60 has a plane of symmetry Ps passing through the main rotary axle 76.

The first and second rods 70, 70', the secondary links 72, 72', the spreader 66, the main link 68 and the support 62 define two main thrust paths.

The linking device 60 also comprises a first and a second fitting 84, 84', which are secured to the support 62 and are disposed on either side of the main clevis 74 in a symmetrical manner with respect to the plane of symmetry Ps. Each of the first and the second fitting 84, 84' comprises an upper branch 86 and a lower branch 88, between which the spreader 66 is positioned. The upper and the lower branch 86, 88 are disposed on either side of the secondary clevis 78 provided at each of the rear ends 70.1, 70.1' of the rods 70, 70', each of the upper and the lower branch 86, 88 comprising a hole 86.1, 88.1 (visible, in particular, in FIG. 7) configured to house the ends of the secondary rotary axles 80.

In the event of a failure of one of the first and the second thrust rod 70, 70', the fitting 84, 84' located in the extension of the failing rod limits the rotational movements about the main rotary axle 76 generated by the remaining rod. Therefore, the fittings 84, 84' define secondary thrust paths.

The first and the second thrust rod 70, 70', the support 62, the spreader 66, the main link 68 and the first and the second secondary link 72, 72' are not described further since they can be identical to those of the prior art.

According to this embodiment, the spreader 66 may pivot about a travel axis of rotation R included in the plane of symmetry Ps and perpendicular to the main rotary axle 76.

The linking device 60 comprises at least one limiting system 90 for limiting the travel of the spreader 66. According to one configuration, the linking device 60 comprises a first and a second limiting system 90, 90', interacting respectively with the first and the second end 66.1, 66.2 of the spreader 66.

According to one configuration, the first and the second limiting system 90, 90' for limiting the travel are identical. Consequently, only the first limiting system 90 interacting with the first end 66.1 of the spreader 66 is described.

According to one embodiment that can be seen in FIGS. 7 and 8, this first limiting system 90 comprises an upper stop 92 positioned above and slightly spaced apart from the upper face F66.1 of the first end 66.1 of the spreader 66, and a lower stop 92' positioned below and slightly spaced apart from the lower face F66.1' of the first end 66.1 of the spreader 66.

"Slightly spaced apart" is understood to mean that there remains a calibrated clearance, for example of about 0.15 mm, between the upper or lower stop 92, 92' and the upper or lower face F66.1, F66.1' of the first end 66.1 of the spreader 66.

According to a particular feature of the invention, the upper and the lower stop 92, 92' are parallel to one another and connected to one another so as to form one and the same part, referred to as a double stop 94.

Consequently, the spacing between the upper and the lower stop 92, 92', which determines the extent of the travel of the first and the second end 66.1, 66.2 of the spreader 66, is not adjusted in situ during independent mounting of the two stops, the upper and the lower, 92, 92' but during the manufacture of the double stop 94 which incorporates the upper and the lower stop 92, 92'. Therefore, during the manufacture of the double stop 94, the upper and the lower stop 92, 92' are spaced apart by the first thickness E1 of the first end 66.1 of the spreader 66 plus twice the calibrated clearance.

According to one embodiment, the double stop 94 is a part exhibiting symmetry of revolution and comprises a cylindrical body 94.1, a first flange 94.2 at a first end of the cylindrical body 94.1 and a second flange 94.3 at a second end of the cylindrical body 94.1, with the cylindrical body, the first and second flanges 94.1, 94.2, 94.3 being coaxial and having the same axis of revolution A94. The first and the second flange 94.2, 94.2 have diameters greater than that of the cylindrical body 94.1. According to one configuration, the first and the second flange 94.2, 94.3 have the same diameter.

According to this embodiment, the first flange 94.2 has a face oriented towards the second flange 94.3 which forms the upper stop 92 and the second flange 94.3 has a face oriented towards the first flange 94.2 which forms the lower stop 92'.

The invention is not restricted to shapes exhibiting symmetry of revolution for the double stop 94. Therefore, the latter could be prismatic.

The double stop 94 is secured to the first fitting 84 by a linking system 96.

According to one embodiment, the double stop 94 comprises a through-hole 98 having an axis A98 perpendicular to the upper and the lower stop 92, 92'.

The linking system 96 comprises:
a tie rod 100 which has a shank 100.1, a head 100.2 at a first end of the shank 100.1 and a threaded portion 100.3 at a second end of the shank 100.1,
a nut 102 configured to be screwed onto the threaded portion 100.3 of the tie rod 100,
a system for blocking the nut 102 so as to immobilize it with respect to the tie rod 100.

The shank 100.1 of the tie rod 100 has a diameter substantially equal to that of the through-hole 98 in the double stop 94 so as to allow the latter to slide along the shank 100.1.

At least a first branch from among the upper and the lower branch 86, 88 comprises a through-orifice 86.2, 88.2 allowing the passage of the shank 100.1 of the tie rod 100. According to one configuration, each of the branches, the upper and the lower, 86, 88 comprises a through-orifice 86.2, 88.2, the through-orifices 86.2, 88.2 in the upper and the lower branch 86, 88 being positioned in such a way that the shank 100.1 of the tie rod 100 is approximately parallel to the secondary rotary axle 80.

The linking system 96 also comprises at least a first ring 104 configured to be positioned around the shank 100.1 of the tie rod 100, interposed between the double stop 94 and a first branch from among the upper and the lower branch 86, 88.

The through-orifice 88.2 in this first branch has a diameter substantially equal to or slightly greater than that of the shank 100.1 of the tie rod 100 but less than the diameter of the head 100.2 of the tie rod 100 and less than the outside diameter of the first ring 104.

The length L of the first ring 104 is determined such that the double stop 94 is correctly positioned with respect to the first branch 88 and interacts with the first end 66.1 of the spreader 66.

During the mounting, the first branch 88 is interposed between the head 100.2 of the tie rod 100 and the first ring 104, the latter and the double stop 94 being positioned around the shank 100.1 of the tie rod 100 between the upper and the lower branch 86, 88. Then, the nut 102 prevents the movement of the tie rod 100, the first ring 104 and the double stop 94 in translation with respect to the first branch 88.

Figure 7:
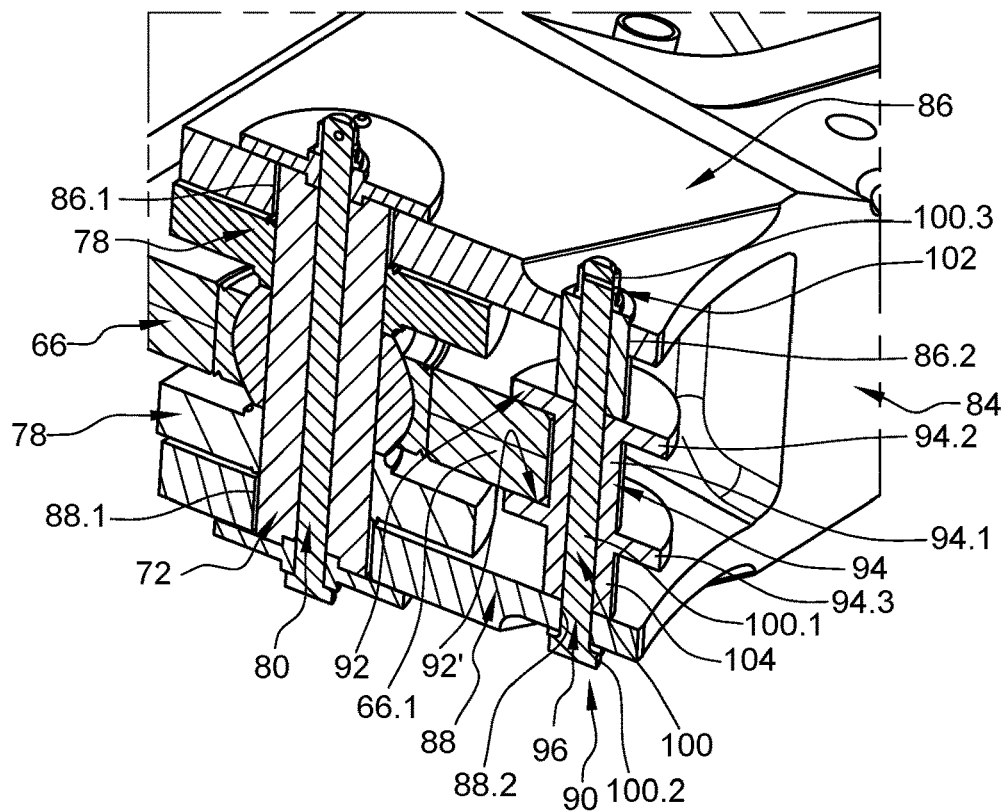
FIG. 7 is a sectional view through the plane PC of a part of the linking device that can be seen in FIG. 5.
Figure 8:
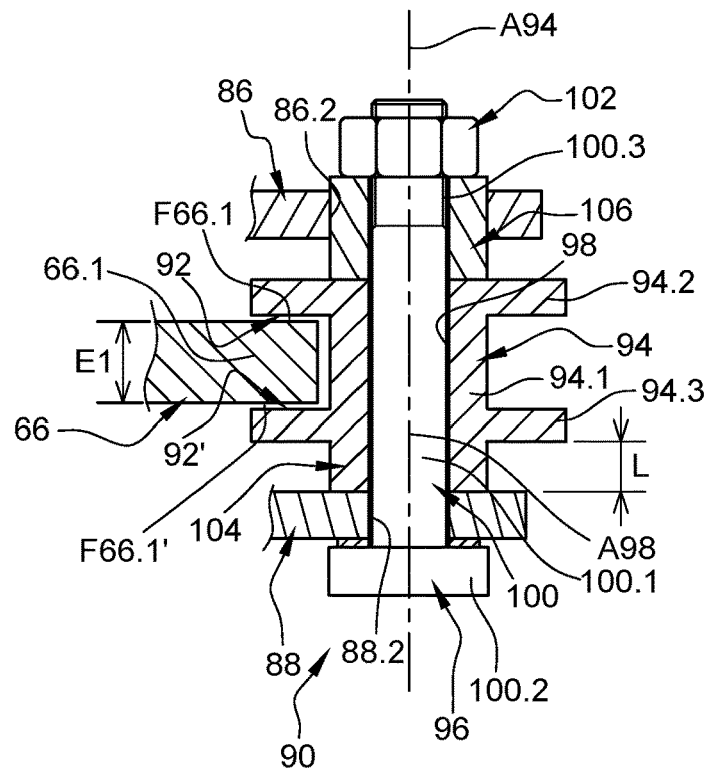
FIG. 8 is a sectional view of a system for limiting the travel of a spreader, illustrating one embodiment of the invention.

According to an embodiment that can be seen in FIGS. 7 and 8, the tie rod 100 has a length which is determined such that its head 100.2 and the nut 102 are positioned on either side of the upper and the lower branch 86, 88.

The linking system 96 comprises a second ring 106 configured to be positioned around the shank 100.1 of the tie rod 100 by being interposed between the double stop 94 and the nut 102. According to one configuration, the second ring 106 has inside and outside diameters that are substantially identical to those of the first ring 104.

In addition, a first branch from among the upper and the lower branch 86, 88 has a through-orifice 88.2 which has a diameter substantially equal to or slightly greater than that of the shank 100.1 of the tie rod 100 but less than the diameter of the head 100.2 of the tie rod 100 and less than the outside diameter of the first ring 104. In parallel, a second branch from among the upper and the lower branch 86, 88 has a through-orifice 86.2 which has a diameter substantially equal, give or take an operating clearance, to the outside diameter of the second ring 106. The operating clearance is determined so as to obtain a sliding fit.

According to the embodiment that can be seen in FIGS. 7 and 8, the tie rod 100 is threaded in the through-orifice 88.2 in the first branch 88, its head 100.2 being positioned outside the upper and lower branches 86, 88; then, the first ring 104, the double stop 94 and the second ring 106 are threaded onto the shank 100.1 of the tie rod 100, the second ring 106 being partially housed in the through-orifice 86.2 in the second branch 86. Lastly, the nut 102 is screwed on so as to prevent the movement of the tie rod 100, the first ring 104, the double stop 94 and the second ring 106 in translation with respect to the first branch 88.

The embodiment that can be seen in FIGS. 7 and 8 allows better take-up of forces in a plane perpendicular to the tie rod 100, the latter being immobilized in a plane perpendicular to the axis of the tie rod 100 at each of its ends by the upper and the lower branch 86, 88.

According to one configuration, the first and the second ring 104, 106 and the double stop 94 have inside diameters that are substantially equal, give or take an operating clearance, to the diameter of the shank 100.1 of the tie rod 100. This configuration makes it possible to flexurally stiffen the linking system 96. The operating clearance is determined so as to obtain a sliding fit.

According to one configuration, the first ring 104 and the double stop 94 form one and the same part. In addition, the through-orifices 86.2, 88.2 have different diameters. This configuration makes it possible to obtain an assembly with poka-yoke features in order to avoid mounting errors.

According to one configuration, the outside diameter of the first ring 104 is greater than the diameter of the through-orifice 86.2 so as to avoid the first ring 104, when it forms one and the same part with the double stop 94, from being mounted upside down on the shank 100.1 of the tie rod 100.

The through-orifices 86.2, 88.2 are made in the upper and the lower branch 86, 88 or in extensions of the upper and the lower branch 86, 88.

The travel-limiting system according to the invention is dismountable and allows lateral mounting/dismounting of the first and the second thrust rod 70, 70'. The fact that the double stop 94 incorporates the upper and the lower stop 92, 92' makes it possible to prevent any wedging.

Lastly, the fact that the double stop is translationally immobilized with respect to a single branch from among the upper and the lower branch 86, 88 makes it possible to simplify the chain dimensioning.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A linking device connecting an aircraft engine and a primary structure of an aircraft pylon, comprising:
    a support configured to be connected to the primary structure,
    a spreader, extending between a first and a second end, which has a central part connected to the support by a main link,
    a first thrust rod having a first end connected to the first end of the spreader by a first secondary link and a second end configured to be connected to the engine,
    a second thrust rod having a first end connected to the second end of the spreader by a second secondary link and a second end configured to be connected to the engine,
    a first and a second fitting, that are secured to the support and have an upper and a lower branch between which the spreader is positioned,
    at least one limiting system for limiting a travel of the spreader having a double stop comprising an upper and a lower stop which are secured to the first or second fitting and between which is positioned the first or second end of the spreader; and
    a linking system connecting the double stop to the first or second fitting, the double stop forming one and the same part,
    wherein at least one first branch from among the upper and the lower branch of the first or second fitting comprises a through-orifice,
    wherein the double stop comprises a through-hole, and
    wherein the linking system comprises:
        a tie rod which has a shank passing through the through-orifice in the first branch and through the through-hole in the double stop, a head at a first end of the shank and a threaded portion at a second end of the shank, the head having a diameter greater than that of the through-orifice in the first branch,
        at least a first ring positioned around the shank of the tie rod and interposed between the double stop and the first branch, the first ring having an outside diameter greater than the diameter of the through-orifice in the first branch and a length which is determined such that the first or second end of the spreader is positioned between the upper and the lower stop,
        a nut screwed onto the threaded portion of the tie rod to prevent the tie rod, the first ring and the double stop from moving in translation with respect to the first branch.

2. The linking device according to claim 1, wherein the double stop is a part exhibiting symmetry of revolution and comprises a cylindrical body, a first flange at a first end of the cylindrical body and a second flange at a second end of the cylindrical body, the cylindrical body, the first and the second flange being coaxial, the first flange having a face oriented towards the second flange which forms the upper stop and the second flange having a face oriented towards the first flange which forms the lower stop.

3. The linking device according to claim 1, wherein the first ring and the double stop have inside diameters that are substantially equal to a diameter of the shank of the tie rod.

4. The linking device according to claim 1, wherein the double stop and the first ring form one and the same part.

5. The linking device according to claim 1, wherein the linking system comprises a second ring positioned around the shank of the tie rod and interposed between the double stop and the nut.

6. The linking device according to claim 5, wherein a second branch from among the upper and the lower branch, that is different from the first branch, comprises a through-orifice having a diameter substantially equal to an outside diameter of the second ring, the shank of the tie rod having a length such that the second ring is housed at least partially in the through-orifice in the second branch.

7. The linking device according to claim 5, wherein the second ring has an inside diameter substantially equal to the diameter of the shank of the tie rod.

8. The linking device according to claim 1, wherein the linking device comprises a first and a second limiting system interacting respectively with the first and the second end of the spreader.

9. An aircraft comprising at least one linking device according to claim 1.

* * * * *